United States Patent [19]

Shyu et al.

[11] Patent Number: 5,254,909
[45] Date of Patent: Oct. 19, 1993

[54] AUTOMATIC LUMINOSITY CYCLICAL MODULATION DEVICE FOR A LIGHTING FACILITY

[75] Inventors: Jia-Ming Shyu; Meng-Feng Li, both of Hsinchu Hsien, Taiwan

[73] Assignee: Norm Pacific Automation Corp., Taiwan

[21] Appl. No.: 877,313

[22] Filed: May 1, 1992

[51] Int. Cl.$^5$ ............... H05B 41/38; H05B 37/02
[52] U.S. Cl. ............................ 315/293; 315/151; 315/158; 315/287; 315/360; 315/DIG. 4
[58] Field of Search .......... 315/151, 158, 246, 287, 315/291, 293, 294, 312, 360, DIG. 4

[56] References Cited

U.S. PATENT DOCUMENTS

| | | | |
|---|---|---|---|
| 3,534,224 | 10/1970 | Skirpan et al. | 315/293 X |
| 4,513,364 | 4/1985 | Nilssen et al. | 315/DIG. 4 X |
| 4,697,122 | 9/1987 | Hoffer | 315/151 X |
| 5,008,865 | 4/1991 | Shaffer et al. | 368/10 |

*Primary Examiner*—David Mis
*Attorney, Agent, or Firm*—Steven M. Rabin

[57] ABSTRACT

A device for modulating and controlling the level of luminosity output by a lighting facility. The modulation may be of average current or voltage. The device modulates electrical power in a cyclical manner for input to the lighting facility, so that the resulting modulation of the luminosity output serves to exercise the eyes of persons exposed thereto. The average luminosity, and the amplitude and period of modulation can be set and adjusted by the user. The rate of modulation is sufficiently slow that the level of change of luminosity is accommodated by human eyes and is imperceptible through the eyes of persons exposed thereto. In one embodiment, an illuminance sensor is provided to read the actual illumination of a lighted object. The values of the illumination so read are fed back in the device to adjust the luminosity of the lighting facility, so that the object is illuminated in the desired cyclical manner.

12 Claims, 5 Drawing Sheets

AUTOMATIC LUMINOSITY CYCLICAL MODULATION DEVICE FOR A LIGHTING FACILITY

BACKGROUND OF THE INVENTION

This invention relates to an automatic control device able to modulate a lighting facility so as to cyclically provide a change of luminosity. The change of luminosity is in a manner that the luminosity increases gradually from a basic luminosity to higher luminosities step by step till it reaches a maximum luminosity, then goes back gradually to the basic luminosity, and then reduces to lower luminosities step by step till it reaches a minimum luminosity, again goes back gradually to the basic luminosity, and so on. That is, the change of luminosity is based on a selected basic luminosity and varies automatically and cyclically with several numbers of slight change of luminosity step-by-step between a range of amplitude. The amplitude and the rate of each slight change of luminosity is designated such that the pupils of one's eyes can obtain gentle exercise and yet the person is without knowledge that there is a luminosity change. A device like this thus is able to take care of one's health of eyes either mentally or physically.

The structure of human eyes is like a camera, and their operations in receiving the light and developing the image are similar too. While taking a picture, a camera must control the aperture ring, focus the distance-setting ring and develop the image at the film. The eyes of a human being operate likewise in response to light reflected to the eyes from an object or scene, it operates. The iris of the eye performs like the aperture ring at a camera. The crystalline lens operates as a camera lens operates. The pupil, which is the opened portion of the lens, is accommodated by the iris. And the retina of the eye can be compared to the camera's film. Therefore, whenever there is a change of luminosity, the pupil of the eye will enlarge or shrink so as to accommodate a suitable luminous flux. The accommodated range of the iris is so broad that it can accept a luminosity flux between 0.2 lx and $10^5$ lx. Due to the after-image visual effect, a slight change of luminosity of an image at the reting won't be perceived. If the luminosity changes in a small range over a time period, the eyes will recognize it as a stable average luminosity. Therefore, as long as the luminosity is changing at a small rate, people won't feel it. However, the pupils will sense and follow that change automatically. Thus a gentle accommodation is derived and a healthy lighting is obtained.

The existing modulation device for a lighting facility, whether a simple ON-OFF switch, a step-switch or a continuous modulation apparatus, once operated remains at that luminosity till otherwise being operated again. The pupils, under these kinds of control must respond in, an instant (and a very short period after) to the change of luminosity. This makes the eyes stay in a steady condition, with a constant level of tension of the eyes muscles. By contrast, there are other light modulation devices, such as one used for a glittering commercial board which purposely modulates the light in swiftly changes that attract our attention. A change of this kind over-excites the eyes.

In fact, good vision and comfortable light environment require enough illumination of the lighted object, a soft brightness contrast between the lighted object and its surrounding, a proper time duration of watching, and a proper change of luminosity at the light source. In other words, a change of luminosity will have the pupil accommodate accordingly. And to appropriately exercise and accommodate the muscles of the eyes, not to keep the eyes stay at a fixed tension over a long period, are the most effective ways of taking care of vision and, physical health, and of providing a happier atmosphere and a higher working efficiency. And yet, in order not to over-exercise or over-excite the eyes, the so-called luminosity modulation shall proceed in a gentle process that the eyes are able to accommodate.

SUMMARY OF THE INVENTION

The present invention, by slowly and continuously modulating the output power of a lighting facility, provides an opportunity for the pupils of a person to accommodate to the change without the person being conscious of the change. One object of the present invention is to provide a device able to automatically modulate the luminosity at a proper speed. Another object of the present invention is to provide a device able to control and modulate cyclically the luminosity of a lighting facility so as to change it gradually to a higher, and then a lower luminosity, around a basic luminosity. A further object of the present invention is to provide a luminosity modulation device for a lighting facility, able to be properly set and changed with respect to a basic luminosity, a range of amplitude of modulation around the basic luminosity, and a time period of each cycle. One object of the present invention is to provide a luminosity modulation device able to automatically adjust for a lighting facility the basic luminosity, the range of the amplitude and the modulation cycle period, modulation according to feedback of the actual luminosity value of a lighted object or the environment.

The invented automatic luminosity cyclical modulation device for a lighting facility controls and modulates the lighting facility according to a basic luminosity, a range of the amplitude change and the period of its cycle. These factors are preset by users, or by the device itself.

BRIEF DESCRIPTION OF THE DRAWINGS

The construction and functions of the present invention will be apparent from the following descriptions, accompanied with the appendant figures, of in which.

DESCRIPTION OF THE PREFERRED EMBODIMENTS

Figure 1:
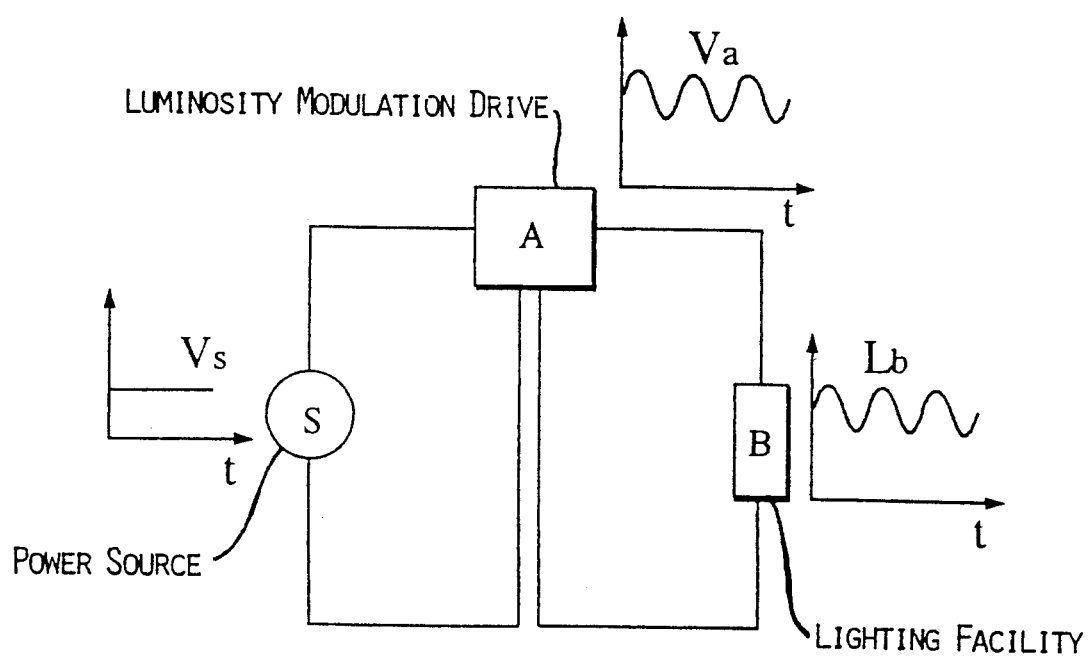
FIG. 1 is an illustration of the function of the present invention while connected with a power source and a lighting facility.

FIG. 1 is an illustration of the function of the present invention while connected with a power source and a lighting facility. In the diagram, an automatic luminosity modulation device, designated A according to the present invention is connected to a lighting facility or lamp B; and a power sources (either an AC or a DC power source). At the embodiment, the device A, connected between the power source S and the lighting facility B, modulates the stable voltage Vs of the power source S into a varying voltage Va which changes over time 't' between higher and lower voltages. This results in a change to the output power or, in other words, the luminosity Lb of the lighting facility B which is connected with the device A. The so called stable voltage Vs of the power source S means the voltage of a DC source or the effective voltage of an AC source. And the curves of the varying voltage Va and the changing luminosity Lb are illustrated as average values over time periods. That is, in shorter time period, the voltage or the luminosity may change frequently, and yet the amplitude of each change is beyond the consciousness of a human being. That is, the rate of change of the luminosity Lb (the change of the luminosity during a time unit) or the change of the illuminance of a lighted object, is designed to be accommodated by the person's pupils and not to raise the person's visual consciousness.

Figure 2:
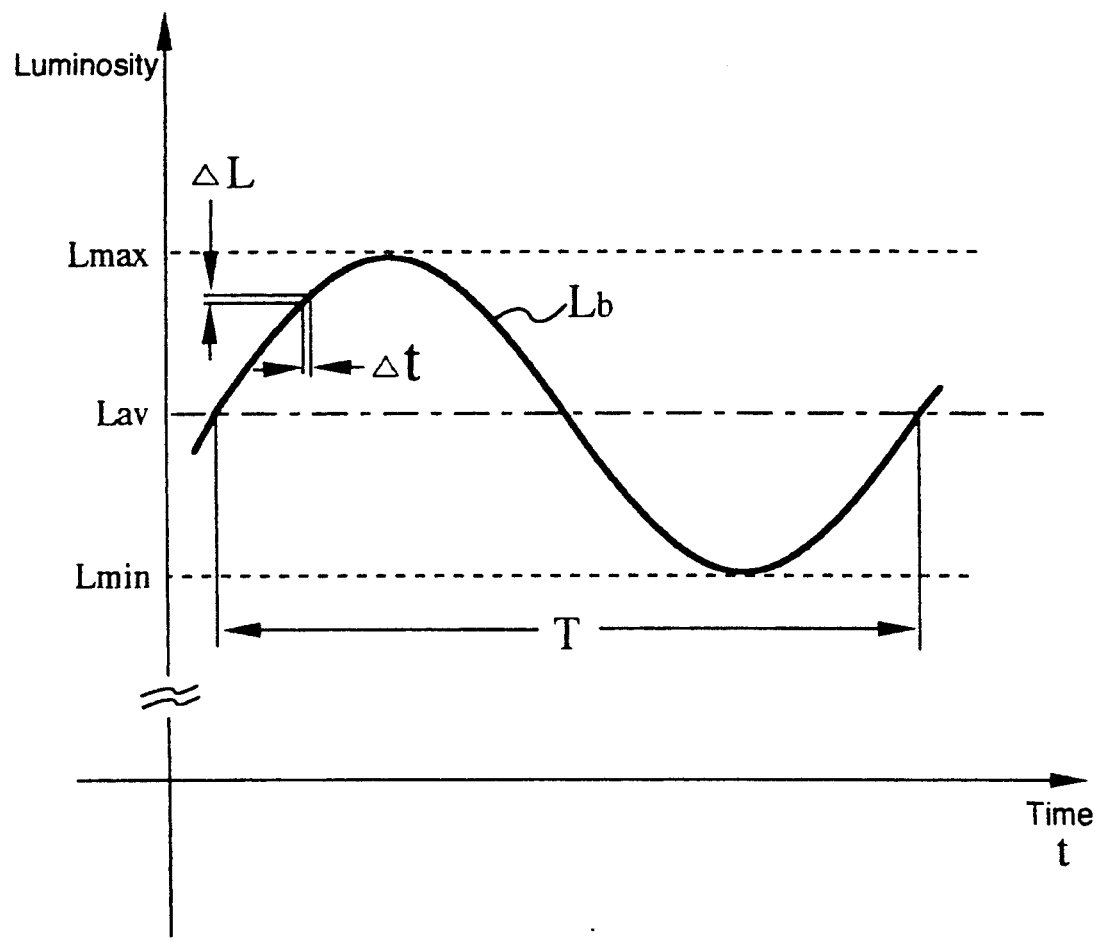
FIG. 2 is a luminosity versus time diagram, illustrating an embodiment of the present invention where the modulation is around a basic luminosity.

FIG. 2 is a luminosity diagram over time sequence of one embodiment of the present invention. It shows the luminosity output Lb of a lighting facility being modulated between a highest luminosity Lmax and a lowest luminosity Lmin at a suitable frequency (a proper cycle T) around a basic luminosity Lav. The modulation curve can be a sinuous wave as shown in the figure or an unshown triangular waveform, as long as the change $\Delta L$ of the luminosity during a very small time period $\Delta t$ is small enough that human being exposed to it will not be conscious of the change and yet their pupils will follow and accommodate the change.

Figure 3:
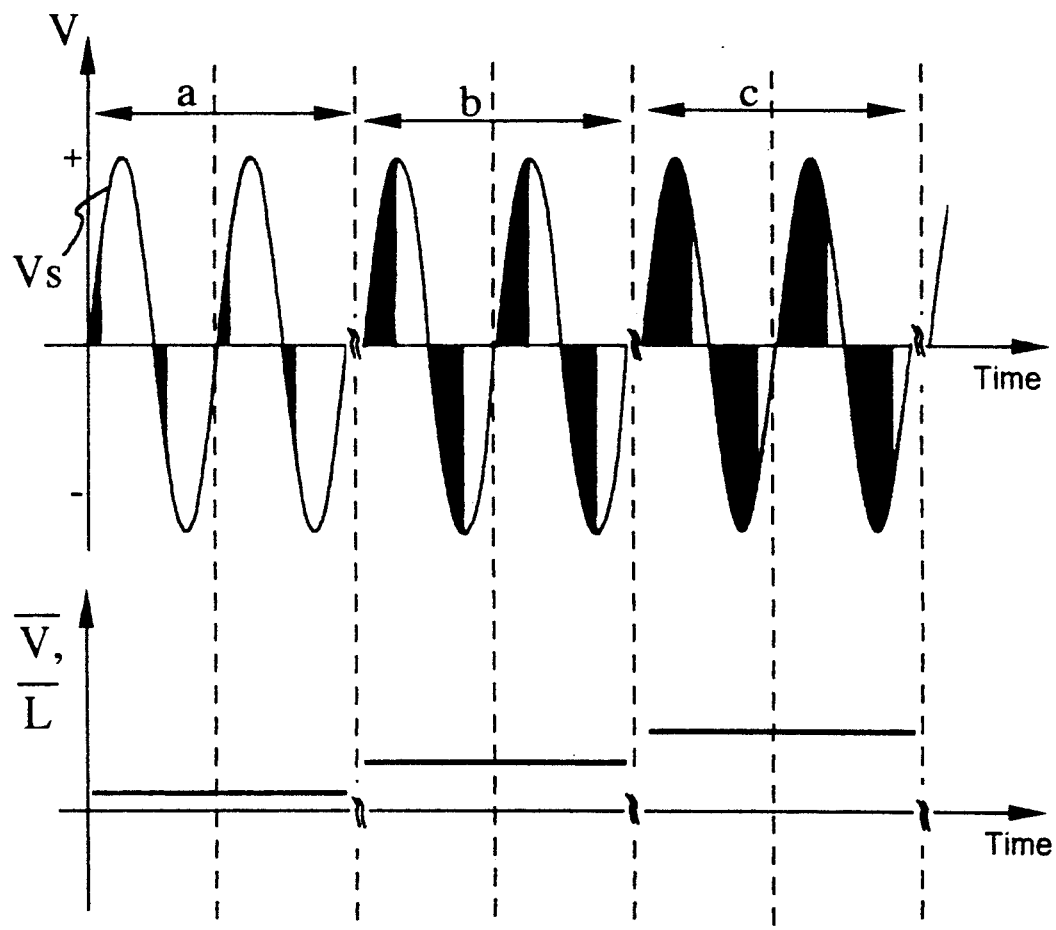
FIG. 3 is an illustration of phase control of an AC power source and its effective average output, according to an embodiment of the present invention.

FIG. 3 is a diagram illustrating a method of phase control of an AC power source in an embodiment of the present invention, and its effective average output $\overline{V}$. The waveform Vs of the power source is shown in the figure. If during a time interval 'a', the power is cut-off each time following a short time increment after the voltage crosses zero, then the output power is a small one as shown in the shading area in time interval 'a', and its average effective voltage $\overline{V}$ or luminosity $\overline{L}$ is a corresponding small value as shown. During a time interval 'b', the power source is cut-off after a longer time than that during time interval 'a', its output power will be as shown by shading area shown for time interval 'b', and the average effective voltage $\overline{V}$ or luminosity $\overline{L}$ is larger or brighter during the time interval 'b' than that at time interval 'a'. During the time interval 'c', the voltage of the power source is cut-off at a much later time after the voltage zero. Then the output power will be as shown by the shading area for time interval 'c', and the resulting average output voltage $\overline{V}$ and average luminosity $\overline{L}$ will be at a much higher value and produce a much brighter environment than during either of the two previously described. Such changes in the output average voltage and output average luminosity can be obtained by modulating the corresponding cut-off time of the power source Vs at different time phases. By some phase-controlled circuits that are composed of general resistors, capacitors, SCR's (Silicon Controlled Resistors), TRIAC's, inverters, comparators etc., which are in the prior art, cut-off signals can be generated to cut-off the power at appropriate times.

Figure 4:
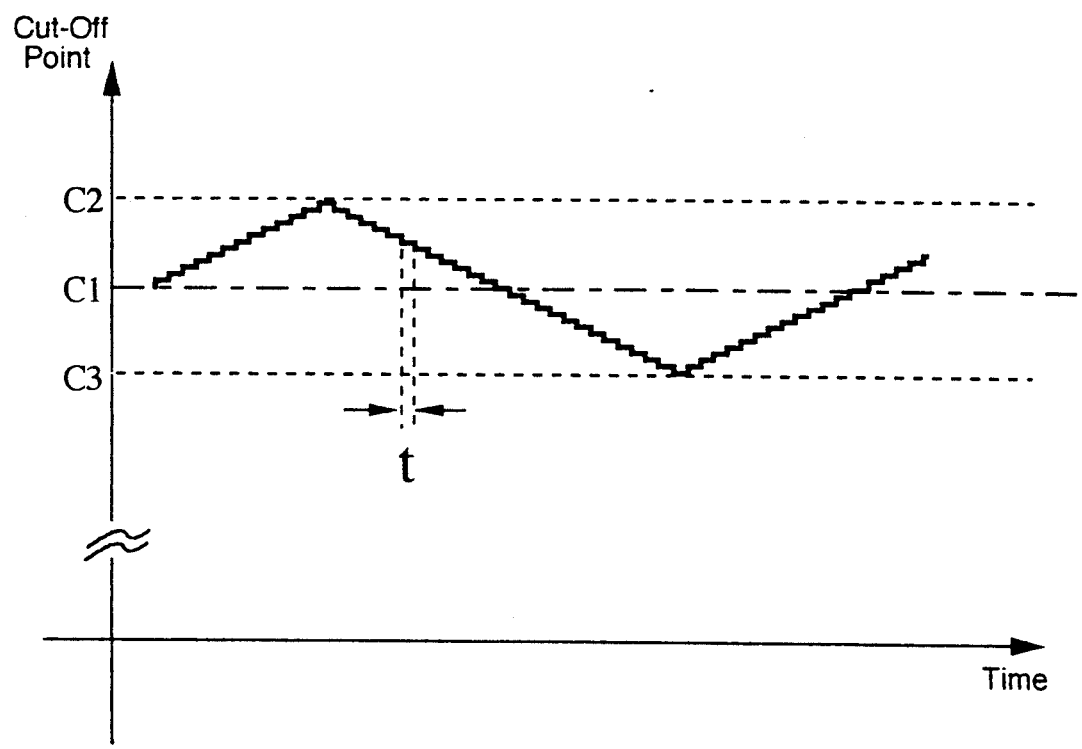
FIG. 4 is a chart illustrating the cut-off points over a time interval for a phase-controlled AC power source, in one embodiment of the present invention.

FIG. 4 is a chart illustrating the cut-off points over time of a phase controlled AC power source, in one embodiment of the present invention. If a user sets, through an unshown input interface, a basic luminosity Lav, an amplitude of the modulation (or a maximum luminosity Lmax, a minimum luminosity Lmin) and a time value T of one cycle of the modulation (see FIG. 2), then a respective cut-off point C1 that produces the basic luminosity Lav, a cut-off point C2 that introduces the brightest luminosity Lmax, and a cut-off point C3 that brings the darkest luminosity Lmin are determined accordingly. (These values, if not been set by a user, will ones preset by the device itself.) In order to simplify the structure of the control circuit, a TRIAC is used as a controlling component in this embodiment of the present invention. There are a limited number (such as 256) of different cut-off points at in each half-cycle of the wave of the power source. The number of these cut-off points is so determined that the change in luminosity between adjacent cut-off points is below the consciousness of human eyes. And each luminosity will be maintained for a small time interval 't'. That interval 't' can be set and changed by a user; however, it is selected to be large enough that a change of the luminosity during the time interval will not exceed what the pupils can accommodate. Therefore, the control of the values of the cut-off points is, as shown in FIG. 4, to appear as stairs: First, the luminosity of the modulated lighting facility starts from a basic value, that is the cut-off point C1 is so selected that it will provide the user a selected basic luminosity Lav. Then, the cut-off point is changed gradually to higher values till a maximum cut-off point C2 is met, so that the luminosity is modulated step-by-step toward brighter luminosities until the maximum luminosity Lmax is reached. Afterwards the cut-off points are reduced step-by-step to reach the cut-off point C3 so as to produce a luminosity through a highest Lmax, then lower to the basic luminosity Lav, and then still again lower to a darkest luminosity Lmin. Now again the cut-off points are changed gradually from C3 to C1, so that the corresponding luminosity is modulating from the darkest luminosity Lmin to the basic luminosity Lav. The aforesaid changes of luminosity are produced in a cycle. This invention automatically modulates the luminosity in cycles like this. The values of cut-off points are provided in order at proper time intervals by an unshown microprocessor, then converted to respective voltage values by a D/A converter, and used as triggering factors for a phase-controlled circuit that is composed of a TRIAC, to cut-off the power. The output voltage produced by this kind of modulation is a sinuous waveform Lb, as shown in FIG. 2.

The above-described modulation also can be applied to a DC power source, that is: to discretely cut off the DC power at a proper frequency for suitable time intervals, so that during some time intervals there are voltage outputs and during other intervals there are no voltage outputs. By changing the durations of these ON and OFF time intervals, the average output voltage is modulated and can change to a higher or a lower luminosity, as required.

Figure 5:
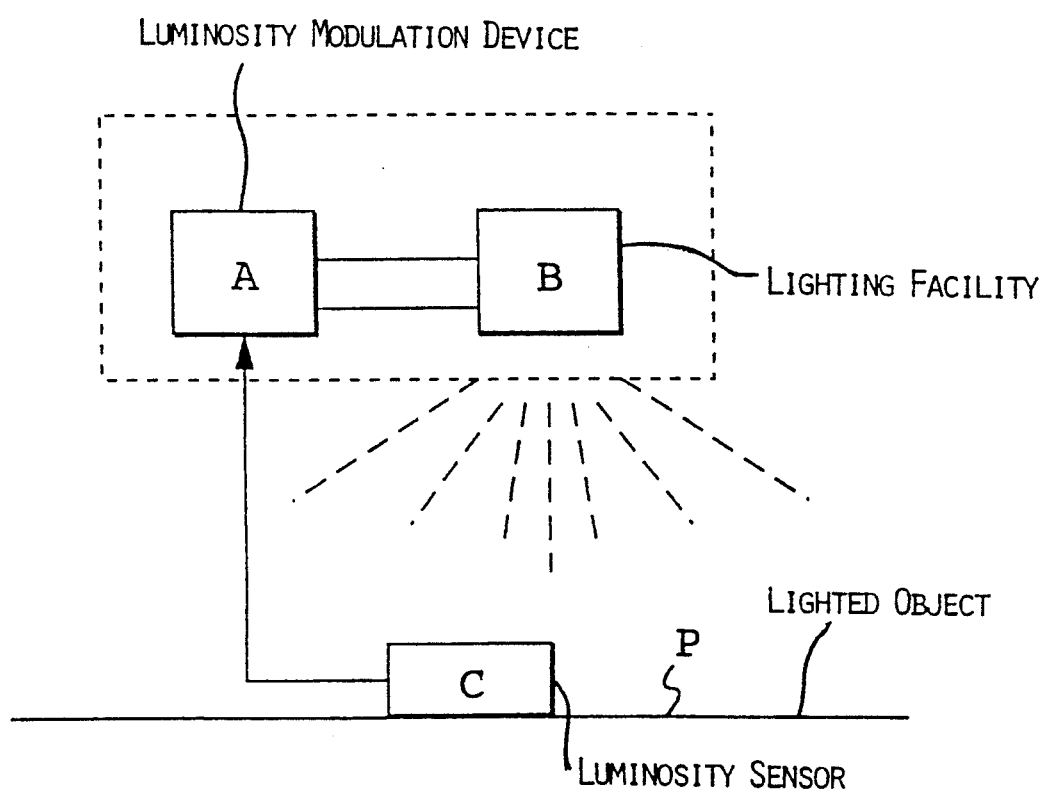
FIG. 5 is an illustration of another embodiment of the present invention where the modulation is automatically adjusted by feedback of actual illuminance of a lighted object.

FIG. 5 is a schematic diagram illustrating another embodiment of the present invention where the actual illuminance of a lighted object is fed back for adjusting the luminosity output by the lighting facility to the surrounded environment. The automatic luminosity modulation device A comprises a illuminance sensor C such as a photo-transistor, photocell, photo-resistor etc. positioning on the lighted object P (such as a table). The sensor C senses the illuminance of the lighted object P and generates signals corresponding to the actual illuminance which might include the effects by some unshown light sources. The illuminance signal is provided to the device A. The device A then compares the signal value with value set by user or by the device itself. Then, in case of any difference, a basic luminosity and a modulation range will be adjusted so as to produce a modulated luminosity equal to what is demanded. So that, the modulation of the luminosity of a lighting facility B can be properly accommodated to the environment; that, is if there are some other light sources, or the relative distance between the lighting facility B and the lighted object P is changed, the present invention will automatically modulate the basic luminosity, and the respective amplitude and time cycle. so as to actually provide a change of the required luminosity (illuminance).

The above-described embodiments modulate the luminosity by modulating the average voltage. In fact, the modulation can be performed by a transformer, or by some other circuit such as a current-limiter, which modulates the average current in a procedure which modulates the output power of a lighting facility as above described, to a higher value, and a lower value step-by-step and periodically. This kind of circuit design, since it can be approached and modified by anyone who is skilled in the related prior arts, need not be described hereinafter.

The method of the present invention that modulates the luminosity of a lighting facility or lamp can be applied to any lighting facility including a bulb, a fluorescent lamp ect. The lighting facility or lamp could also be a CRT (cathode ray tube) of a television, a monitor of the computer or a display unit and automatically modulate the average (basic) luminosity. Although the invention is described with respect to some preferred embodiments, modifications thereto will be apparent to those skilled in the art. Therefore, the scope of the invention is to be determined only by reference to the following claims.

What is claimed is:

1. A device for controlling luminosity from a lamp powered by an electrical power source, comprising
   power supplying means, connected to the power source and the lamp, for automatically supplying electrical power from the power source to the lamp, with a preset cyclically varying level, such that a resulting, predetermined cyclical variation in the level of luminosity from the lamp is imperceptible through the eyes of persons exposed thereto; and
   means, operable by a user, for setting values corresponding to an average level, the period of variation and the amplitude of variation of the electrical power supplied to the lamp by said supplying means.

2. A device according to claim 1, wherein the cyclical variation is triangular.

3. A device according to claim 1, wherein the cyclical variation is sinuous.

4. A device according to claim 1, further comprising means for detecting illuminance of an oject lighted by said lighting facility and generating a correspondent signal for automatically adjusting the amplitude and period of variation of the electrical power supplied to the lamp.

5. A device for controlling luminosity, comprising
   a lamp for illuminating an object;
   power supplying means, connected to a power source and the lamp, for automatically supplying electrical power from the power source to the lamp, with a preset cyclically varying level, such that a resulting predetermined cyclical variation in the level of luminosity of the object is imperceptible through the eyes of persons exposed thereto; and
   means, operable by a user for setting values corresponding to an average level, the period of variation, and the amplitude of variation, of the electrical power supplied to the lamp by said power supplying means.

6. A device according to claim 5, wherein said lamp comprises a fluorescent lamp.

7. A device according to claim 5, wherein said lamp comprises a cathode ray tube.

8. A device according to claim 5, wherein said lamp comprises a light bulb.

9. A device according to claim 5, wherein the power source is an AC power source and said power supplying means comprises a phase control means, including
   cut-off means for cutting off the supply of power to the lamp during respective phase intervals of the AC power; and
   means for modulating said phase intervals.

10. A device according to claim 9, wherein said cutting-off means comprises a TRIAC, further comprising a microprocessor for supplying values of cut-off times in time sequence, a D/A converter means for converting said values to voltages of corresponding levels, said voltages being transmitted to said TRIAC for triggering the cut-off of power.

11. A device according to claim 5, further comprising means for sensing illuminance of an object illuminated by said lamp, and feedback means for feeding back a signal, indicative of the sensed luminosity, to said power supplying means, said power supplying means supplying power to said lamp according to the values set in said setting means and the fed back signal, so that the luminosity of the object varies cyclically in a predetermined manner, taking into account other sources of illumination of the object.

12. A device according to claim 5, wherein said power supplying means automatically supplies electrical power to the lamp with a preset cyclically varying level having a constant periodicity.

* * * * *